(12) United States Patent
Fakhrai et al.

(10) Patent No.: US 8,914,851 B2
(45) Date of Patent: Dec. 16, 2014

(54) METHOD AND SYSTEM FOR IMPROVED SECURITY

(75) Inventors: Delaram Fakhrai, Laguna Beach, CA (US); Mehran Moshfeghi, Rancho Palos Verdes, CA (US)

(73) Assignee: Golba LLC, Rancho Palos Verdes, CA (US)

(*) Notice: Subject to any disclaimer, the term of this patent is extended or adjusted under 35 U.S.C. 154(b) by 16 days.

(21) Appl. No.: 13/312,934

(22) Filed: Dec. 6, 2011

(65) Prior Publication Data

US 2012/0144464 A1  Jun. 7, 2012

Related U.S. Application Data

(60) Provisional application No. 61/420,175, filed on Dec. 6, 2010.

(51) Int. Cl.
| | | |
|---|---|---|
| H04L 29/06 | (2006.01) | |
| G06F 15/16 | (2006.01) | |
| H04L 9/32 | (2006.01) | |
| G06F 21/41 | (2013.01) | |

(52) U.S. Cl.
CPC .... H04L 63/0815 (2013.01); *G06F 2221/2111* (2013.01); *H04L 63/105* (2013.01); G06F 21/41 (2013.01)
USPC .................................... 726/4; 726/5; 709/229

(58) Field of Classification Search
None
See application file for complete search history.

(56) References Cited

U.S. PATENT DOCUMENTS

| | | | |
|---|---|---|---|
| 6,748,532 B1 | 6/2004 | Digiorgio et al. | |
| 7,207,061 B2 | 4/2007 | Martin et al. | |
| 7,496,952 B2 | 2/2009 | Edwards, Jr. et al. | |
| 7,660,880 B2* | 2/2010 | Ting et al. | 709/223 |
| 7,690,025 B2* | 3/2010 | Grewal et al. | 726/8 |
| 7,761,911 B2* | 7/2010 | Song | 726/9 |
| 7,788,700 B1* | 8/2010 | Feezel et al. | 726/2 |
| 8,689,353 B2* | 4/2014 | Bunter | 726/28 |
| 2005/0262026 A1* | 11/2005 | Watkins | 705/67 |
| 2008/0066168 A1* | 3/2008 | Gregg et al. | 726/7 |
| 2008/0289019 A1* | 11/2008 | Lam | 726/9 |
| 2009/0064291 A1* | 3/2009 | Wahl | 726/5 |
| 2010/0031023 A1 | 2/2010 | Dodd | |
| 2010/0050251 A1* | 2/2010 | Speyer et al. | 726/20 |
| 2010/0122314 A1 | 5/2010 | Zhang et al. | |

(Continued)

FOREIGN PATENT DOCUMENTS

WO  WO 2012/005739  1/2012

OTHER PUBLICATIONS

Portions of prosecution history of U.S. Appl. No. 13/681,667, filed Jan. 29, 2014, Golba LLC.

*Primary Examiner* — Christopher Revak
(74) *Attorney, Agent, or Firm* — Adeli LLP

(57) ABSTRACT

An improved authentication method and system is provided where a user securely accesses a variety of target servers for online email, online banking, credit card purchases, ecommerce, brokerage services, corporate databases, and online content (movies, music and software). The method involves a bridge server performing authentication tasks that allow a user to access a server or a group of servers with multiple security levels. The method eliminates the need for the user to remember multiple usernames/passwords for each target server. The method also allows one bridge server and one set of security devices to be used to authenticate the user for multiple servers, thereby reducing security costs and increasing user convenience. A location-based password-ID generating device is also described for secure location-based access.

31 Claims, 10 Drawing Sheets

(56) References Cited

U.S. PATENT DOCUMENTS

| | | | |
|---|---|---|---|
| 2010/0235623 A1* | 9/2010 | Simpson et al. | 713/155 |
| 2010/0274859 A1* | 10/2010 | Bucuk | 709/206 |
| 2011/0047628 A1* | 2/2011 | Viars | 726/28 |
| 2013/0262856 A1 | 10/2013 | Moshfeghi | |

* cited by examiner

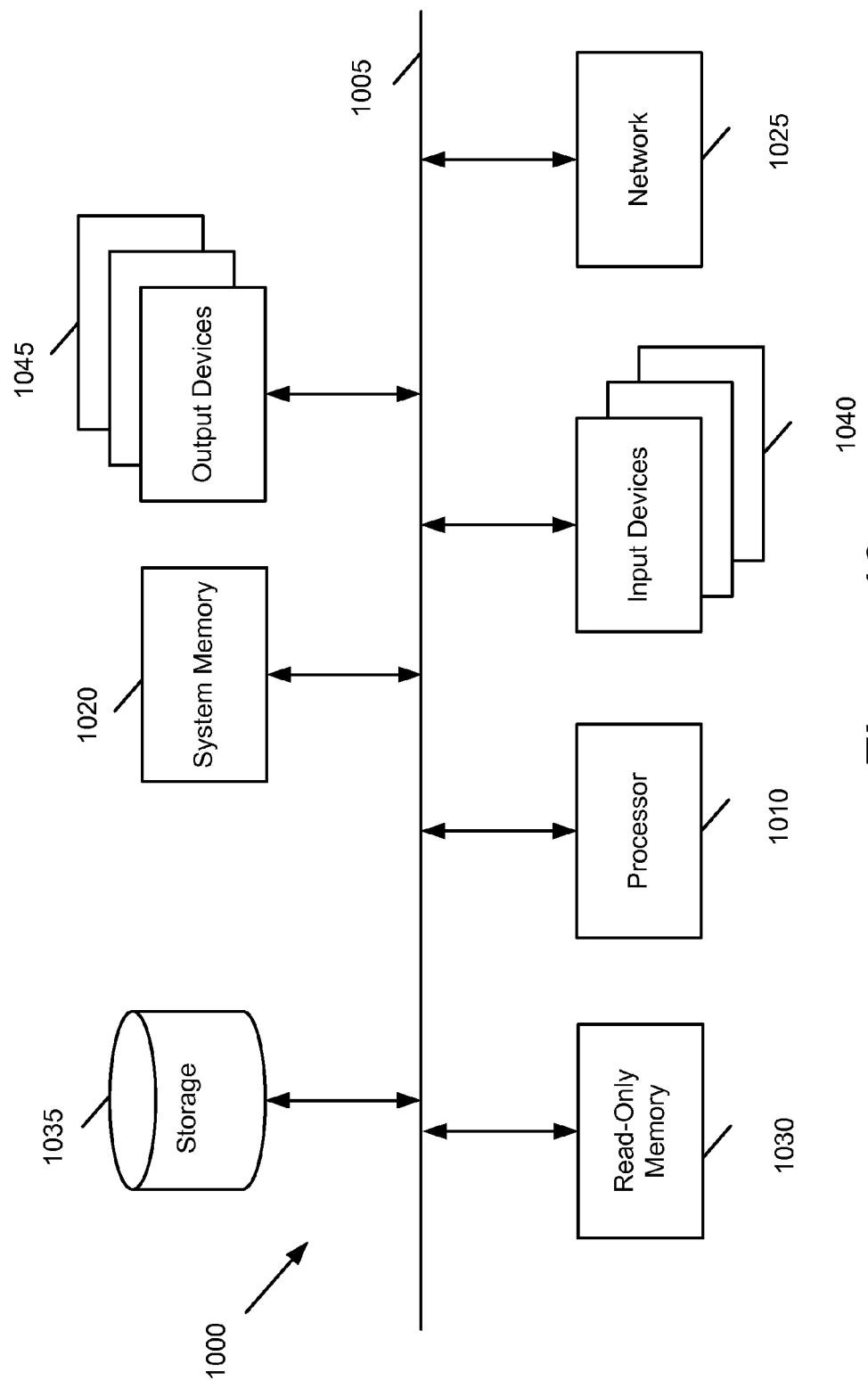

METHOD AND SYSTEM FOR IMPROVED SECURITY

CLAIM OF BENEFIT TO PRIOR APPLICATIONS

The present Application claims the benefit of U.S. Provisional Patent Application 61/420,175, entitled, "Method and system for Improved Security," filed Dec. 6, 2010. The contents of U.S. Provisional Application 61/420,175 are hereby incorporated by reference.

BACKGROUND

Today, secure authentication between a user (or client) and a server is conducted solely by the server and the user, and is constrained by the capabilities and limitations of the server, the user device, and the link between them. The authentication is typically done by the user using a username/password.

There are severe security limitations with this configuration. Passwords and usernames are generally selected as short phrases to be remembered and are not changed frequently from one login to the next login. This increases the risk of interception. The wireless or wire-line link between the user device and the server is also typically a simple connection and poses a high risk of interception.

Also, when a user has to access multiple servers, the user needs to remember multiple passwords or carry multiple secureID tags in order to access different servers. Performing complex and specialized authentication tasks such as location-based security, voice signature, or other biometrics by each individual server is expensive and might not be feasible for some servers to perform.

BRIEF SUMMARY

Some embodiments provide a method and system where a user who wants to access a server A or multiple servers (A, A1, etc.) employs a bridge server B for performing multi-level authentications. The bridge server B manages the authentication tasks on behalf of several independent servers. As a result, the user uses one set of identifications for access to all servers and does not have to memorize specific usernames/passwords for accessing many servers. Since the same bridge server and same security devices are used to authenticate the user for multiple servers, the cost is reduced and the user ease-of use is increased by not having to carry multiple security devices. For instance, the same secureID tag is used in some embodiments to access different servers for online email, online banking, credit card purchases, ecommerce, brokerage services, corporate databases, and online content.

In some embodiments, the bridge server creates dynamically changing authentication data such as usernames and passwords and shares them with the other independent servers. The authentication tasks performed by server B in some embodiments include location-based security, voice signature, or other biometrics.

The user is provided with different options to use the bridge server B in some embodiments. For instance, the user connects to server A first, gets redirected to the bridge server B, and after authentication by server B gets access to server A. Alternatively, the user connects to server B, gets authenticated by server B and gets limited access to multiple servers (A, A1, etc.). The user then chooses a particular server and possibly provides additional authentication information to B for accessing that particular server.

In some embodiments, server B is one physical server while in other embodiments server B is a centralized or geographically distributed network of servers which are connected with secure and encrypted links.

Server B, which acts as a bridge for authentication between server A and the user, also identifies any fake or predatory websites attempting access to username/password information of the user. The bridge server in some embodiments authenticates the "claimed identity" of server A (besides user authentication). There will be an authentication mechanism, such as a server identification (ID) code, for server B to confirm the "claimed identity" of server A. Otherwise, server B identifies server A as a fraudulent server and refuses to authenticate the user for server A. A fixed ID code set between server A and B is used in some embodiments but has the risk of interception. Some embodiments use a more secure dynamic ID code, which server B generates and synchronizes with server A at time interval.

In some embodiments, encryption or a virtual private network (VPN) on the network connections are used (such as between any server A and bridge server B, or between the user and any of the servers) to increase security. One level of authentication security deployed by server B to authenticate the user is through a software program or application installed on user A's device, computer, phone, smartphone, etc. This application generates codes in the user device that are identifiable and/or synchronized by server B. This generated code is used to authenticate the user by server B.

Some embodiments provide a graded authentication security level. In these embodiments when the user attempts accessing server A, a "graded" access is enabled by cooperation between servers A and B. Server B provides different authentication levels {S1, S2, ..., SN} to the user when accessing server A. If the user only passes authentication level S1 (e.g., username/password only), then a limited access to server A is granted (e.g., viewing statement with no ability to make any transactions). If the user passes ultimate level SN through server B, then the user gets full access to server A's database (e.g., performing money transfers).

Some embodiments automatically change password per login. Once a secure link between servers A and B is established and the user is authenticated, a new password is negotiated/set/confirmed between servers A and B (through the established secure link). The next time the user attempts accessing server A, server B uses the newly set password to authenticate the user for server A. This will eliminate the risk of interception of the password being used to establish the secure link. Once the encryption is enabled between servers A and B, a new password is negotiated and the first password is no longer useful. Based on the setup and negotiation between servers A and B, the password assigned to the user to access server A can be automatically changed by server B in the background (no user interaction involved) as often as desired (hourly, daily, etc.). This makes the password actually used to login the user into server A varying over time.

The actual act of authentication of the user for server A through server B is communicated in different ways in different embodiments. Some embodiments establish a three way secure network between servers A, B, and the user. In some of these embodiments, the actual password is submitted to server A directly by server B. In other embodiments, server B submits the username/password to the user (after an encrypted link is established) and the user submits the username/password to server A directly. In some embodiments, the user establishes encrypted links with both servers A and B and the user submits authentication passwords to both servers. In other embodiments, the authentication password is submitted by server B to server A.

The authentication mechanism through bridge server B is used in some embodiments for cases where server A is authenticating the user to accept a credit card for online transaction. Server A will require an authentication by server B before allowing the user to use certain credit cards for online purchases. For instance, in some embodiments, the user is authenticated/authorized for limited access to server A. However, once the user wants to make a purchase, the user is redirected to server B for a higher level authentication/ authorization. In some embodiments, server A has stored the user's credit card information. However, when the user tries to use the credit card on file to make a purchase, the user is directed by server A to server B for higher level of authentication so that the user can use the credit card on file with server A.

Server B in some embodiments authenticates the user for server A and after the user accesses his/her account with server A, the user is given the option by server A to save his/her documents, statements, transaction copies, email attachments, snapshots, etc. to the user's account with server B. Server A then provides a link for the user to transfer and save the above items to the user's account with server B. Server B is therefore used as a safe-box by the user to store and protect all his/her documents from servers A, A1, A2, etc. The saved material is then accessed independent of servers A, A1, etc., by the user by just logging into his/her account with server B. Access to these materials is also protected in some embodiments by multi-level security authentication such that more sensitive data (e.g., bank statements) would require higher levels of authentication.

Some embodiments utilize location based authentication. For instance, some embodiments utilize Wi-Fi access-point or MAC/IP based authentication. Some embodiments perform location-based authentication mechanism that includes the use of a location-based secureID device by the user and a target server A. In these embodiments, the user's online access to the server A is authorized only if the user's geographical location is confirmed by bridge server B to be within a pre-determined location, set of locations, region, or set of regions.

Some embodiments utilize a location-based secure ID device that includes adding a positioning module and encoding to the device (in addition to a conventional seed and counter) so a hacker cannot fake the location. The positioning module uses conventional location detection methods such as GPS or WiFi. An external power source (e.g. through a USB interface) is used to power the positioning module and conserve the power of the integrated on-device battery in some embodiments. The secureID device in some embodiments is integrated into a host mobile device such as a cell phone, laptop, portable music device, etc. and its power comes from the host device/platform.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 10 conceptually illustrates an electronic system with which some embodiments of the invention are implemented.

DETAILED DESCRIPTION

Figure 1:
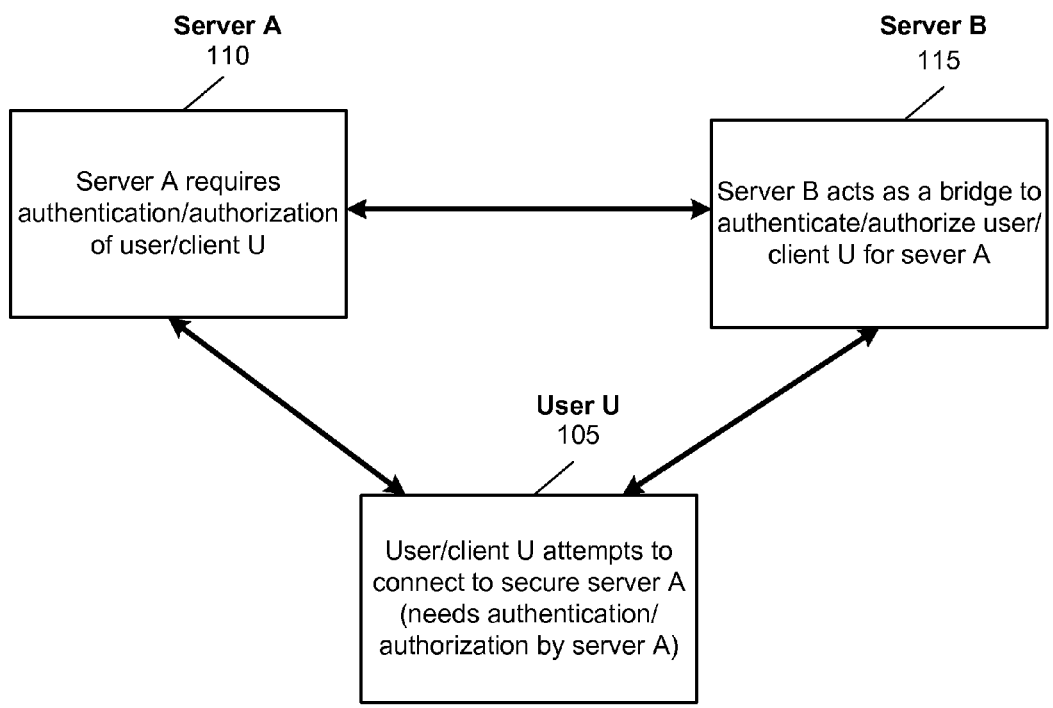
FIG. 1 conceptually illustrates a system for authenticating a user in some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method and system where a user who wants to access a server A or multiple servers (A, A1, etc.) employs a bridge server B for performing multi-level authentications. The bridge server B manages the authentication tasks on behalf of several independent servers. As a result, the user uses one set of identifications for access to all servers and does not have to memorize specific user-names/passwords for accessing many servers. Since the same bridge server and same security devices are used to authenticate the user for multiple servers, the cost is reduced and the user ease-of use is increased by not having to carry multiple security devices. For instance, the same secureID tag is used in some embodiments to access different servers for online email, online banking, credit card purchases, ecommerce, brokerage services, corporate databases, and online content.

In some embodiments, the bridge server creates dynamically changing authentication data such as usernames and passwords and shares them with the other independent servers. The authentication tasks performed by server B in some embodiments include location-based security, voice signature, or other biometrics.

The user is provided with different options to use the bridge server B in some embodiments. For instance, the user connects to server A first, gets redirected to the bridge server B, and after authentication by server B gets access to server A. Alternatively, the user connects to server B, gets authenticated by server B and gets limited access to multiple servers (A, A1, etc.). The user then chooses a particular server and possibly provides additional authentication information to B for accessing that particular server.

In some embodiments, server B is one physical server while in other embodiments server B is a centralized or geographically distributed network of servers which are connected with secure and encrypted links.

Server B, which acts as a bridge for authentication between server A and the user, also identifies any fake or predatory websites attempting access to username/password information of the user. The bridge server in some embodiments authenticates the "claimed identity" of server A (besides user authentication). There will be an authentication mechanism, such as a server identification (ID) code, for server B to confirm the "claimed identity" of server A. Otherwise, server B identifies server A as a fraudulent server and refuses to authenticate the user for server A. A fixed ID code set between server A and B is used in some embodiments but has the risk of interception. Some embodiments use a more secure dynamic ID code, which server B generates and synchronizes with server A at time interval.

In some embodiments, encryption or a virtual private network (VPN) on the network connections are used (such as between any server A and bridge server B, or between the user and any of the servers) to increase security. One level of authentication security deployed by server B to authenticate the user is through a software program or application installed on user A's device, computer, phone, smartphone, etc. This application generates codes in the user device that are identifiable and/or synchronized by server B. This generated code is used to authenticate the user by server B.

Some embodiments provide a graded authentication security level. In these embodiments when the user attempts accessing server A, a "graded" access is enabled by cooperation between servers A and B. Server B provides different authentication levels {S1, S2, . . . , SN} to the user when accessing server A. If the user only passes authentication level S1 (e.g., username/password only), then a limited access to server A is granted (e.g., viewing statement with no ability to make any transactions). If the user passes ultimate level SN through server B, then the user gets full access to server A's database (e.g., performing money transfers).

Some embodiments automatically change password per login. Once a secure link between servers A and B is established and the user is authenticated, a new password is negotiated/set/confirmed between servers A and B (through the established secure link). The next time the user attempts accessing server A, server B uses the newly set password to authenticate the user for server A. This will eliminate the risk of interception of the password being used to establish the secure link. Once the encryption is enabled between servers A and B, a new password is negotiated and the first password is no longer useful. Based on the setup and negotiation between servers A and B, the password assigned to the user to access server A can be automatically changed by server B in the background (no user interaction involved) as often as desired (hourly, daily, etc.). This makes the password actually used to login the user into server A varying over time.

The actual act of authentication of the user for server A through server B is communicated in different ways in different embodiments. Some embodiments establish a three way secure network between servers A, B, and the user. In some of these embodiments, the actual password is submitted to server A directly by server B. In other embodiments, server B submits the username/password to the user (after an encrypted link is established) and the user submits the username/password to server A directly. In some embodiments, the user establishes encrypted links with both servers A and B and the user submits authentication passwords to both servers. In other embodiments, the authentication password is submitted by server B to server A.

The authentication mechanism through bridge server B is used in some embodiments for cases where server A is authenticating the user to accept a credit card for online transaction. Server A will require an authentication by server B before allowing the user to use certain credit cards for online purchases. For instance, in some embodiments, the user is authenticated/authorized for limited access to server A. However, once the user wants to make a purchase, the user is redirected to server B for a higher level authentication/authorization. In some embodiments, server A has stored the user's credit card information. However, when the user tries to use the credit card on file to make a purchase, the user is directed by server A to server B for higher level of authentication so that the user can use the credit card on file with server A.

Server B in some embodiments authenticates the user for server A and after the user accesses his/her account with server A, the user is given the option by server A to save his/her documents, statements, transaction copies, email attachments, snapshots, etc. to the user's account with server B. Server A then provides a link for the user to transfer and save the above items to the user's account with server B. Server B is therefore used as a safe-box by the user to store and protect all his/her documents from servers A, A1, A2, etc. The saved material is then accessed independent of servers A, A1, etc., by the user by just logging into his/her account with server B. Access to these materials is also protected in some embodiments by multi-level security authentication such that more sensitive data (e.g., bank statements) would require higher levels of authentication.

Some embodiments utilize location based authentication. For instance, some embodiments utilize Wi-Fi access-point or MAC/IP based authentication. Some embodiments perform location-based authentication mechanism that includes the use of a location-based secureID device by the user and a target server A. In these embodiments, the user's online access to the server A is authorized only if the user's geographical location is confirmed by bridge server B to be within a pre-determined location, set of locations, region, or set of regions.

Some embodiments utilize a location-based secure ID device that includes adding a positioning module and encoding to the device (in addition to a conventional seed and counter) so a hacker cannot fake the location. The positioning module uses conventional location detection methods such as GPS or WiFi. An external power source (e.g. through a USB interface) is used to power the positioning module and conserve the power of the integrated on-device battery in some embodiments. The secureID device in some embodiments is integrated into a host mobile device such as a cell phone, laptop, portable music device, etc. and its power comes from the host device/platform.

Some embodiments describe a method of providing secure access to a first server for a user. The method is performed at a second server. The method receives a request to authenticate the user for accessing one or more services in a set of services provided by the first server. Each service is associated with a corresponding security level. The method receives a selection of a particular security level. The method receives a set of security information to authentication the user for the selected particular security level. When the received set of security information is validated by the second server, the method sends a set of credentials from the second server to the first server to authenticate the user on the first server for using the services corresponding to the selected particular security level.

Some embodiments provide a device for location-based authentication of a user by an authenticating server. The device includes a positioning module for determining a set of coordinates for the device. The device also includes a randomizer for generating a password based on the set of coordinates. The device also includes a display for displaying the generated password. The generated password is utilized by the user as one of a set of authentication information to send to the authentication server. The user is authenticated only when the estimated set of coordinates are within a pre-determined threshold.

Some embodiments provide a non-transitory computer readable medium that stores a computer program for authenticating a user. The computer program is executable by a processing unit. The computer program includes sets of instructions for (i) displaying a list of a set of servers, (ii) receiving a selection of a particular server in the set of servers, (iii) receiving information for authenticating the user to access the particular server; and (iv) sending, when the received information is validated, a set of credentials to the particular server to enable the user to access the particular server.

Some embodiments provide a machine readable medium that stores a program that includes a graphical user interface (GUI). The program is executable by at least one processing unit. The GUI includes a display area for displaying a list of a set of servers. The GUI also includes a tool for receiving a selection of one of the servers for access by a user. The display area is also for prompting the user to enter authentication information for a selected server. The GUI also includes a tool for receiving the authentication information entered by the user. When the received authentication information is validated, a set of credentials are sent to the selected server to enable the user to access the selected server. In some embodiments, the display area of the GUI is also for displaying a list of security levels for a selected server. Several more embodiments are described in the following sections.

I. Overview

Some embodiments provide a mechanism for online secure authentication/authorization and online access. FIG. 1 conceptually illustrates a system for authenticating and/or authorizing a user in some embodiments of the invention. The figure shows a user device U 105, a server A 110 that requires authentication and/or authorization of the user, and a server B 115 that acts as a bridge to authenticate and/or authorize the user for server A 110.

In some embodiments, server A 110 relies on the 3rd machine (server B 115) to authenticate and authorize a highly secure access/connection between two terminals or machines, where one of the terminals 105 is used by user U to access the second terminal, Server A 110. In other words, server A outsources server A's user authentication and authorization to another entity, namely server B. Server B performs the management, validation, and maintenance tasks for authentication and authorization of the user on behalf of server A.

In this specification, the terms user device, user terminal, client device, or client terminal refer to a device used to access services and/or information on a remote server such as server A. The terms user or client refer to a person that is using a client device. As described further below, some security mechanisms such as voice recognition or biometric information are used to identify a particular person with a great degree of certainty. Other security mechanisms such as user name and password provide a lesser degree of certainty about the identity of a particular person using a client device. For instance, a husband and wife might share the same user name and password to access a joint bank account. However, one of ordinary skill in the art will recognize that the disclosure and teaching of the current invention can be applied for providing secure access to a remote server by authenticating and/or authorizing either (i) a particular user/client, (ii) a particular group of users/clients, or (iii) a device/terminal used by such person or persons. One of ordinary skill in the art will also recognize that for a user to access a remote server, both the user and the user device are authenticated and authorized. Accordingly, for the purpose of brevity and unless otherwise stated, any discussion for providing secure access, authenticating, or authorizing in this specification applies to any of the aforementioned three categories of a person, a group of persons, or a device.

Also, authentication refers to the process of verifying the identity of a user while authorization refers to the process of verifying what an authenticated user is authorized (or entitled) to do. The disclosure and teachings of different embodiments of the invention equally applies to the processes of authentication and authorization. Therefore, for brevity and unless otherwise stated techniques disclosed in this specification for authentication also applies to authorization and vice versa.

The followings are examples of scenarios that a user/client U 105 might desire to access server A 110 services: user/client U 105 is a user/client trying to i) login to an online email account, ii) login to online e-commerce accounts, iii) login to online financial accounts such as bank accounts, brokerage accounts, etc., iv) authorize online financial transactions, v) access corporate servers and databases, or vi) re-authenticate or reactivate copyright protected material such as software, music, movies, etc.

The following sections describe different embodiments where user U 105 accesses server A 110 or multiple independent servers (A, A1, etc.) by employing bridge server B 115 for performing multi-level access authentications. In some embodiments, server B manages all authentication tasks on behalf of several independent servers (A, A1, etc.) such that the user does not have to memorize server specific usernames/passwords for authentication.

Centralizing authentication at one bridge server also reduces cost. Server B creates dynamically changing authentication data (e.g. usernames/passwords) for improved security and shares them with the independent servers. Server B also performs more complex authentication tasks such as location-based security, voice signature, or other biometrics for higher level information access. The disclosed methods allow the same device to be used to authenticate a user for multiple servers A, A1, etc. (e.g. same secureID tag used to access different servers for online email, online banking, credit card purchases, ecommerce, brokerage services, corporate databases, and online content). This reduces cost and eliminates the need for the user to carry multiple devices.

One mode of operation is that user U goes to server A first, gets redirected to server B, and after authentication by server B gets access to server A. Another mode of operation is where user U goes to server B, gets authenticated by server B and gets limited access to multiple servers (A, A1, etc.), and then chooses a particular server and possibly provides additional authentication information to server B for accessing that particular server with a higher access level.

II. Using Bridge Server For Authentication And Authorization

In the system of FIG. 1, Server B 115 acts as a bridge for the authentication and/or authorization process. Sever B utilizes more sophisticated and complex authentication procedures for each user U 105 and shares this authentication capability with all servers needing to authenticate and/or authorize user U.

Some embodiments support several security levels with the use of additional measures. These measures include a secure identification (secureID) tag (such as RSA), location tag, voice signature, text message or email, fingerprint and other biometrics, computer-specific information such as media access control identification (MacID) or media access control address (MAC address), and WiFi, etc. SecureID tags such as RSA are used frequently to provide two factor authentication for accessing corporate information from outside.

With secureID tags, the user in some embodiments carries a small device with a display that uses a seed to generate and display a number every so often. The server also has the same seed so the numbers should match. Therefore, in addition to the password, the user also has to provide the seed generated number to be authenticated.

Location tags (using global positioning system (GPS), WiFi, or other means) provide location information, and rules are setup such that the user is only allowed to access a server from a particular range of locations. For voice authentication, the user is asked to pronounce one or more words in order to be recognized. In some embodiments, the users are sent text messages or email to confirm their identity. The MacID or WiFi identifying information are also used to match the user's computer in some embodiments.

Figure 2:
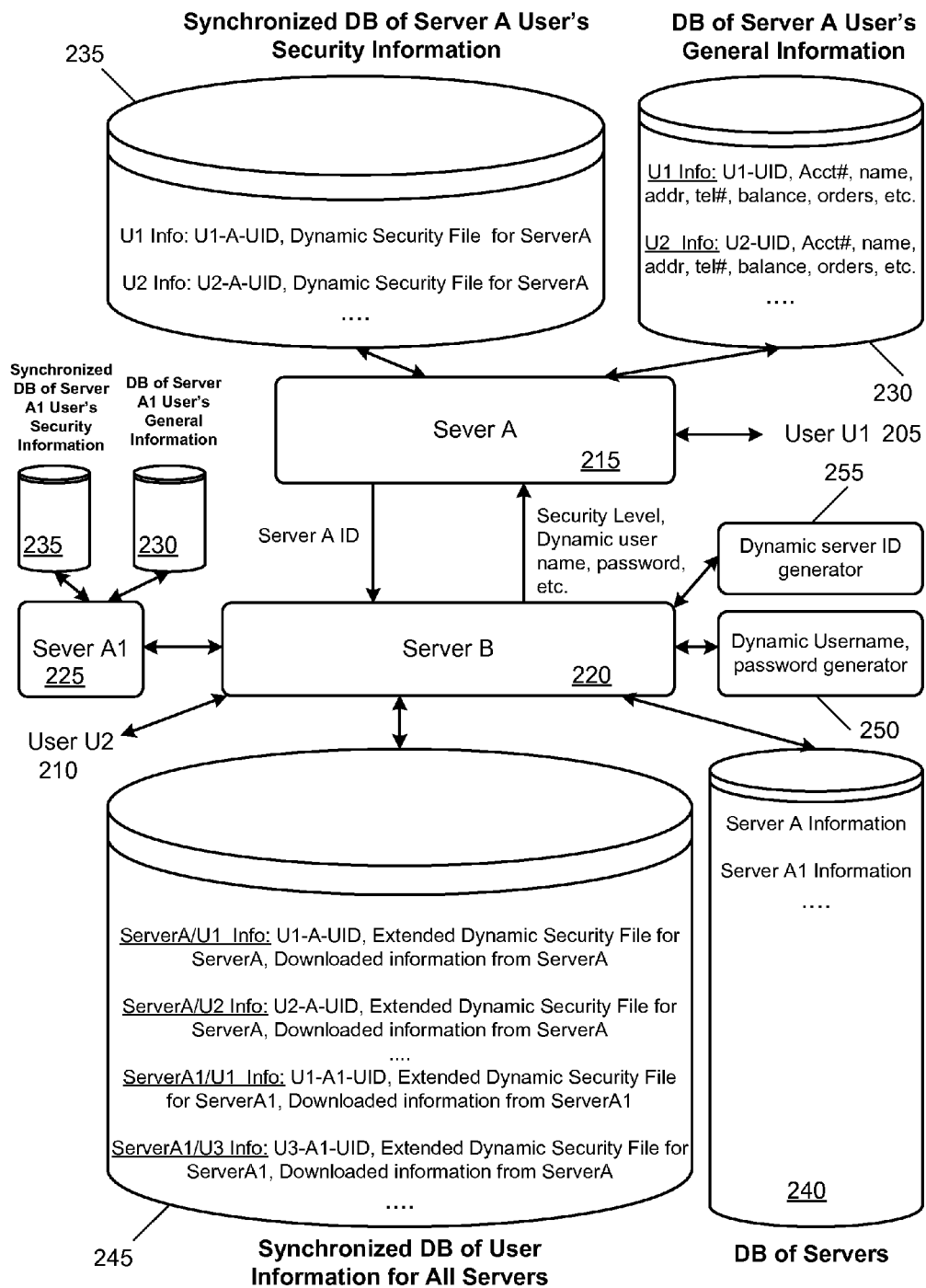
FIG. 2 conceptually illustrates the architecture of the security system of some embodiments of the invention.

FIG. 2 conceptually illustrates the architecture of the security system of some embodiments of the invention. In different embodiments, the system is implemented using different hardware implementations and different partitioning of hardware and software modules to perform the functional blocks outlined. A user either accesses server A 215 directly (such as shown for user U1 205) and is redirected to server B 220 or goes directly to server B (such as shown for user U2 210) in order to get authorized and access multiple servers (only two servers are shown here; server A 215 and server A1 225).

In some embodiments, server B 220 is one physical server while in other embodiments server B is a centralized or geographically distributed network of servers that are connected with secure and encrypted links. Server B uses dynamic authentication generator modules that generate user and server authentication information respectively. For instance, a module 250 dynamically generates usernames/passwords for user authentication, while another module 255 dynamically generates server IDs for server authentication in some embodiments. Server B 220 shares the dynamically generated usernames/passwords with servers like server A 215 and A1 225. The username/password for each server at any given time is different from other servers. Each server (e.g. server A, server A1, etc.) has a database (or database table) 230 that include general user information (e.g. name, account number, address, telephone number, orders, balance, etc.), as well as a database (or database table) 235 that includes dynamic security information for users. The dynamic security information for each user includes a dynamic security file in some embodiments. The dynamic security file for server A (and other servers like it, e.g., server A1) includes security information such as dynamic username, dynamic password, number of security levels, security level rules, security level rules that assign access privileges to each security level in some embodiments.

As shown, server B 220 has a database (or database table) 240 that stores identifying information about the servers that server B manages. In some embodiments, this includes information for authenticating the servers such as time varying dynamically generated server IDs. Server B also has a database (or database table) 245 of user information for all the servers that is manages. Server B in some embodiments does not store general user information such as account number, balance, orders, etc. Instead server B stores an extended dynamic security information file for users of each server. These files have similar information as the dynamic security information file of servers A, A1, etc., but also have additional security information. The file in server B also has the extended dynamic security information for all servers.

FIG. 2 also illustrates an example (as shown by the information stored in database 245) where user1 (U1) and user2 (U2) are registered for server A, while user1 (U1) and user3 (U3) are registered for server A1 (i.e. user2 is not registered for server A1). The extended dynamic security file for each server (e.g., server A, server A1) stored in server B includes one or more of the following information: dynamic username, dynamic password, security questions, secureID tag seed/counter (so the server matches the user's secureID tag seed/counter), voice signature file, authorized locations (for location-based access), authorized MAC addresses of user's terminal or internet connection, voice recognition files, biometrics recognition files, number of security levels, security level rules, security level rules that assign access privileges to each security level, and preferences.

As can be seen from the above discussion, some of the elements of the extended dynamic security file (such as secureID tag seed, voice recognition, biometrics, etc.) are only stored in server B's databases. This is because the complexity of authentication is carried out primarily at server B. Servers such as A, A1 do not need these since they do not perform those authentications and instead just do simple authentications such as dynamic username/password checking at their end. Since complex authentication for multiple servers is carried out at server B the cost is reduced (i.e. one server B, one secureID or location tag, one voice recognition system, etc., instead of replicating them for each server A, A1, etc).

The security related databases of server B and the servers it manages (e.g. server A, server A1, etc.) have to be synchronized in order to make sure that the latest security information is reflected in all the databases. In some embodiments, this synchronization is initiated by either server. For instance, the synchronization is initiated by server B in some embodiments whenever there is a change in username, password or other security information that is stored in server B's databases. For example, if server B changes the username/password for server A then server B contacts server A and requests to synchronize server B security database with that of server A. Likewise, when there is a change in the security database of A (such as number of security levels, security access rules, preferences) server A contacts server B and requests to updates those entries in server B's security database that are related to server A.

The preference information stored in the databases of server B and the servers A, A1, etc., include user interface layout preferences. For example, when a user logs into B directly the preferences in some embodiments determine how all the different servers that the user can access are organized and displayed on the user interface (as described by reference to FIG. 6, below). Some servers require additional security information before they could be accessed but even their presence and the user having accounts with them could for example be hidden by a preference setting. While FIG. 2 shows each database as one entity, in some embodiments databases are distributed across multiple physical machines and multiple tables. The database tables in some embodiments also use standard methods that use unique keys to identify different users and servers.

FIG. 2 also shows an embodiment where server B's user information database 245 includes downloaded information from the servers that server B manages. For instance, when an authenticated user is interacting with server A and decides to download and save documents or other forms of information, the information is stored on a database of server B instead of on the local storage of the user's computer terminal. This information, in some embodiments, is stored and organized by using the unique ID for the user and the ID for the server where the information was downloaded from. The saved information in some embodiments also has the same security levels as the server it was downloaded from. For instance, a user who has downloaded and saved such information from server A has to provide the same security access level to server B that it would require for server A (to access that information) before the user can view the downloaded information on server B's database.

One scenario is as follows. Server B authenticates user U for server A and after user U accesses his/her account with server A, user U is given the option by server A to save his/her documents, statements, transaction copies, email attachments, snapshots, etc. to user U's account with server B. Server A then provides a link for user U to transfer and save the above items to user U's account with server B. Server B is therefore used as a safe-box by user U to store and protect all his/her documents from servers A, A1, A2, etc. The saved material is then accessed independent of servers A, A1, etc., by user U by just logging into his/her account with server B. Access to these materials can be also protected by multi-level security authentication such that more sensitive data (e.g., bank statements) would require higher levels of authentication.

Server B in some embodiments also has a database (not shown in FIG. 2) that includes the usernames/passwords for all users registered with server B. This username/password in some embodiments allows access to the lowest security level of servers A, A1, etc. In some embodiments, a security specialist company manages server B. Compared to other organizations, such security companies are better suited to deploy the latest security methods for protecting server B's usernames/passwords and all the databases storing dynamic security files. In addition, the user can also set preferences so that server B's username/password does not provide any access to their accounts at server A, A1, etc.; not even the lowest level access. So if server B's username/password is compromised by a hacker the hacker would still need to provide additional user authentication data to gain high level access to servers A, A1, etc. Other security mechanisms used by server B include encryption or a virtual private network (VPN) on the network connections (e.g. between server A and server B, and between server B and its databases). The following describes different processes for FIG. 2 and possible variations on it.

Server B, which acts as a bridge for authentication between server A and user U, is a centralized server in some embodiments. In other embodiments, server B is a geographically distributed network of servers that are connected with secure and encrypted links.

In addition to authenticating users, bridge server B in some embodiments uses authentication mechanisms for checking the "claimed identity" of server A. This mechanism takes the form of a private code, unique key, IP/MAC address, etc. For example, a secure time varying code such as a dynamically generated server ID in some embodiments is utilized to authenticate server A and B to each other. Using this mechanism, a fake or predatory server pretending to be server A fails authentication by server B and user U's login information is not communicated to the fraudulent/fake server A. A fixed server ID between server A and B can also be used but it has the risk of being intercepted.

When user U requests access to server A's database (e.g., accessing server A's website, etc.), user U is transferred to server B for authentication. The transfer is conducted in several ways. For example on server A's website, there can be a link to forward user U to server B (as discussed by reference to FIG. 3, below). As described further below, at server B, the user U has different options for authentication. Once user U is authenticated by server B, the authentication is "passed" to server A. As another example, the user U goes directly to server B, gets authenticated, and then can access multiple servers, one of which is server A, as described by reference to FIG. 6, below.

The actual act of authenticating user U for server A through server B is communicated in different ways in different embodiments. In some embodiments, a three-way secure network is established between servers A, B, and user U. In some of these embodiments, the actual password is submitted to server A directly by server B. In some embodiments, server B submits the username/password to user U after an encrypted link is established, and user U submits the username/password to server A directly. Once user U is transferred to server B a highly secure and encrypted link is established between user U, server B, and server A. These secure links are utilized to authenticate user U by server B, and "transfer" this authentication to server A.

Different grades of authentication are available to user U by server B in some embodiments. Depending on the nature of server A, different levels of security are determined and configured by a combination of user U, server B, and server A. For example, if server A is an online banking system, a higher level of authentication is performed by server B on user U. However, for cases where server A is an online email server, lower level of authentication is performed by server B.

One level of authentication security deployed by server B is through a software program or application installed on user U's device, computer, phone, smartphone, etc. This application generates codes that are identifiable and/or synchronized by server B. This generated code is then used for authenticating user U by server B.

When server A forwards user U to B (e.g. after the user chooses authentication with B), different authentication mechanisms and levels are deployed depending on the security grade requested/supported by server A. Server B in different embodiments uses different authentication methods such as one or more of i) simple username/password, ii) security questions, iii) a secure code sent through a text message or an email to user U by server B, iv) a secure code generator device that is in sync with server B, v) live phone call confirmation, vi) user U's location using a secure GPS device or WiFi location, vii) IP/MAC address of user U's terminal or Internet connection, viii) voice recognition, and ix) finger print, retinal scan, or other biometrics through a secure authorized device. Thus, different embodiments provide location-based authentication, Wi-Fi access point MAC/IP based authentication, voice signature, finger print or other biometrics methods.

A multi-level graded access of user U to server A is enabled by cooperation between servers A and server B in some embodiments. In these embodiments, server B provides different authentication levels {S1, S2, ..., SN} to user U when accessing server A. If user U only passes authentication level S1 (e.g., username/password only), then a limited access to server A is granted (e.g., when server A is an online banking system user U is able to view statements but not able to make any transactions). As user U passes higher authentication levels provided by server B, user U gets access to more information on server A and/or is able to do more transactions on server A. If user U passes ultimate level SN through server B, then user U gets full access to server A's databases and is able to make more secure transactions (e.g., perform money transfers).

In some embodiments, the link between server A and server B, and the link between server B and server B's databases, are highly secure links using virtual private networks (VPN) or encryption.

Some embodiments provide automatic password changes per login. In these embodiments, once a secure link between servers A and B is established and user U is authenticated, a new password is negotiated/set/confirmed between servers A and B through the established secure link. The next time user U attempts to access server A, server B uses the newly set password to authenticate user U for server A. This eliminates the risk of someone intercepting the password (either through the network, or by hacking into the databases of server A or server B) and using it to establish a secure link. Once encryption is enabled between servers A and B, a new password is negotiated and the previous password is no longer useful.

Based on the setup and negotiation between servers A and B, the password assigned to user U to access server A in some embodiments is automatically changed by server B in the background without user interaction and as often as desired (hourly, daily, etc.). This makes the password used to login user U into server A time varying and eliminates the risk of a malicious web site or person intercepting a password and using it to establish a secure link.

The above authentication mechanism with bridge server B is used in some embodiments where server A is authenticating user U to accept a credit card for online transaction. Thus, server A will require an authentication by server B before allowing user U to use certain credit cards for online purchases. For instance, in some embodiments, the user is authenticated/authorized for limited access to server A. However, once the user wants to make a purchase, the user is redirected to server B for a higher level authentication/authorization.

A. Redirecting the User to the Bridge Server

Figure 3:
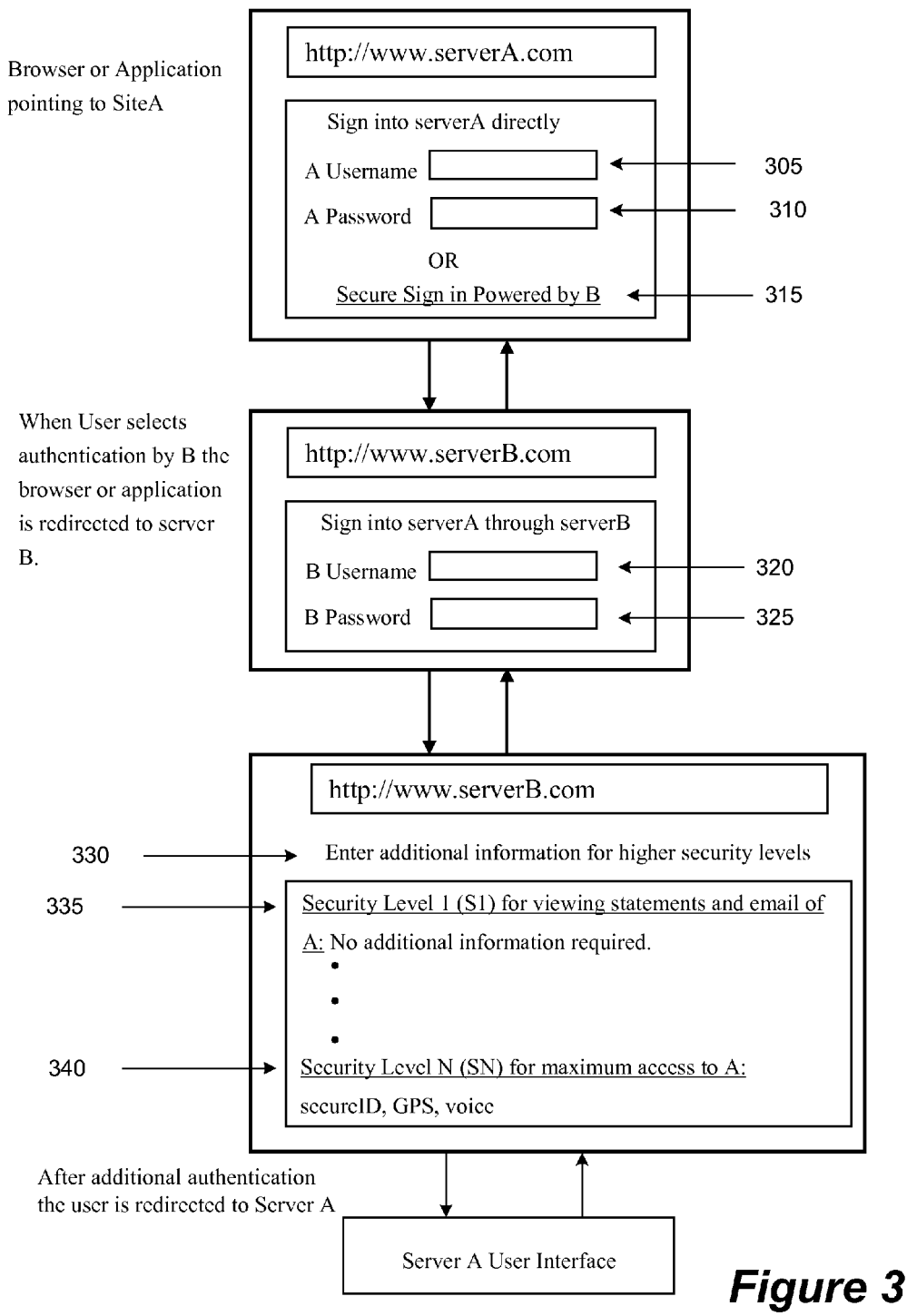
FIG. 3 conceptually illustrates a user interface where user goes directly to server A to access information (e.g., accessing server A's website, etc.) in some embodiments of the invention.

FIG. 3 conceptually illustrates a user interface where user U goes directly to server A to access information (e.g., accessing its website, etc.) in some embodiments of the invention. As shown in the graphical user interface of FIG. 3, the user has the option to use conventional methods such as entering username 305 and password 310 to login directly to server A. But the user is also provided with a link 315 such as "Secure Sign in Powered by B".

FIG. 3 shows the case where the user chooses to utilize the link and is transferred to server B for authentication. At first user U logs in with the lowest security level of server B, by for instance providing username 320 and/password 325 (if incorrect the user in some embodiments is allowed to re-enter a number of times before being locked out).

Then server B provides the user (as shown by arrow 330) with different security level options with different access levels to information and transactions available on the referring server (server A in this example). The user interface informs the user that in order to access more information from server A, the user has to provide additional security information. For example the lowest security "level 1" 335 only requires username/password on server B and hence does not need any additional information, whereas in this example the highest level N 340 requires secureID, position and voice authentication in addition to username/password. The user enters this information and, if correct, is authenticated (if incorrect the user is typically allowed to re-enter a number of times before being locked out).

Once user U is authenticated by server B for the appropriate security level, this authentication is passed to server A and user U is redirected to use server A. If the user wants a higher security level he/she is redirected back to B to provide additional authentication information before being redirected to A with a higher security credential. The mapping of security levels to information access levels in some embodiments is configured jointly by server A and user U and is stored in security level rules in synchronized databases of servers A and B (as shown in FIG. 2). Server B uses this information to provide the security level options and their information access levels to the user.

Figure 4:
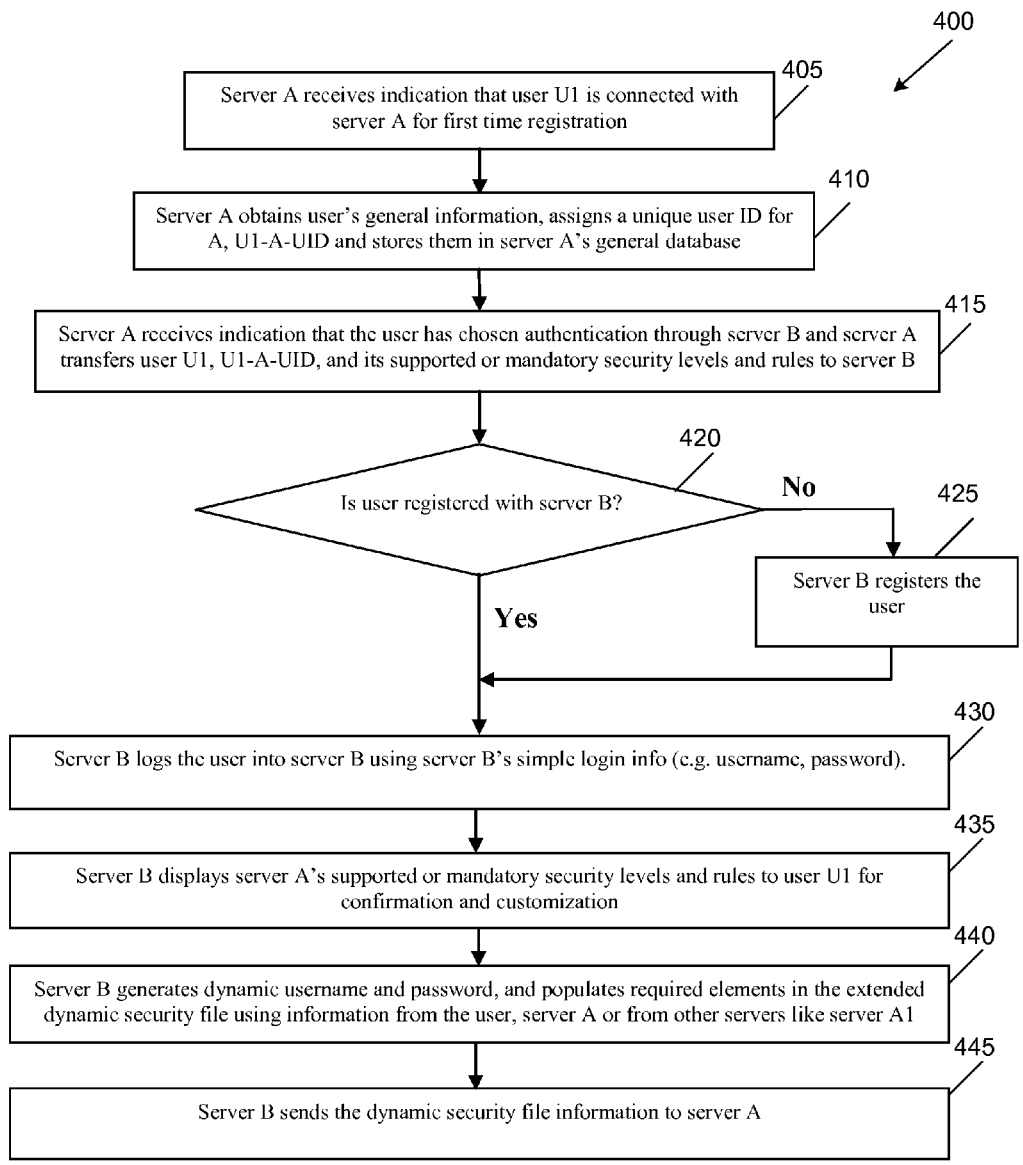
FIG. 4 conceptually illustrates a flow diagram for FIG. 3 in some embodiments of the invention where user performs a first time registration with server A.

FIG. 4 conceptually illustrates a process 400 and a flow diagram for FIG. 3 in some embodiments of the invention where user U1 performs a first time registration with server A. As shown, server A receives (at 405) an indication that user U1 is connected with server A for first time registration. Subsequently, server A obtains (at 410) user U1's general information (name, address, telephone, account number), assigns a unique user ID for A, U1-A-UID, and stores this information in its general user information database.

Next, server A receives an indication that user U1 has chosen (at 415) to be authenticated through server B and server A transfers user U1, U1-A-UID, and its supported or mandatory security levels and rules to server B. In some embodiments, server A communicates/shares server A's list of users and associated rules with server B in advance. In other embodiments, server A exchanges the rules per user at the time of login. In some embodiments, when server A has users that have chosen not to use server B's authentication method, Server A sends the information for these users to server B only when the information is needed (e.g., when extra authentication is required or when the user decides to use server B authentication at a later time). If (as determined at 420) user U1 is not registered with server B, the user is prompted to register first. Server B then registers (at 425) the user. Server B then logs (at 430) the user into server B by using server B's simple login information (e.g. username/password).

Server B then displays (at 435) server A's supported or mandatory security levels and rules to user U1 for confirmation and customization. For example security rules in some embodiments state that secureID for email can be optional and customized, but secureID is mandatory for bank transactions. Server B then generates (at 440) a dynamic username/password, and populates required elements in server B's extended dynamic security file. Server B then sends (at 445) only the dynamic security file information to server A for A to store in its database.

Server B either gets secureID seed (e.g. through a serial number), voice file, location tag, etc., from the user or populates them for that user from other servers like A1. For example, assume that user U1 first registers with server A through server B. User U1 uses its username/password with server B to login to server B and complete the registration process by providing more information for the extended dynamic security file. Server B records information for user U1 under server A. Now assume the same user U1 attempts to register with a new server A1. Server A1 forwards user U1 to server B. User U1 again uses its username/password with server B to login to server B. Since user U1 has the same username/password (his/her login info with server B), server B identifies that this user had previously enabled and populated for example secureID info in a previous registration (i.e., for server A). Therefore, server B uses the previous info from user U1's registration with server A and reuse that for registration with server A1.

In FIG. 4 user U1 doesn't need to create any username/password directly with server A because the management of user U login username/password is performed by server B. However, in an alternative embodiment, when user U1 is registering with server A, after server A obtains user U1's general information server A gives an option to user U1 to select a login username/password directly with server A. After the user chooses that option and creates direct server A username/password, the user can still be directed to server B as described above. The direct username/password with server A will have the lowest security level. The purpose of this direct login is to allow user U1 to directly login to his/her account with server A without going to server B.

This username/password is only stored on server A's databases and allows user U to access his/her account with server A but with very minimal access privileges which may not be very useful. An advantage provided by different embodiments of this invention is that user U1 doesn't have to memorize specific usernames/passwords for accessing many servers A, A1, etc.

One of ordinary skill in the art will recognize that process 400 shown in FIG. 4 is a conceptual representation of the operations used for registering a user with server A for the first time. The specific operations of process 400 may not be performed in the exact order shown and described. Furthermore, the specific operations of process 400 may not be performed in one continuous series of operations and different specific operations may be performed in different embodiments. Also, the process could be implemented using several sub-processes, or as part of a larger macro process. For instance, operations 405-415 may be performed by server A while operations 420-445 may be performed by server B in some embodiments.

Figure 5:
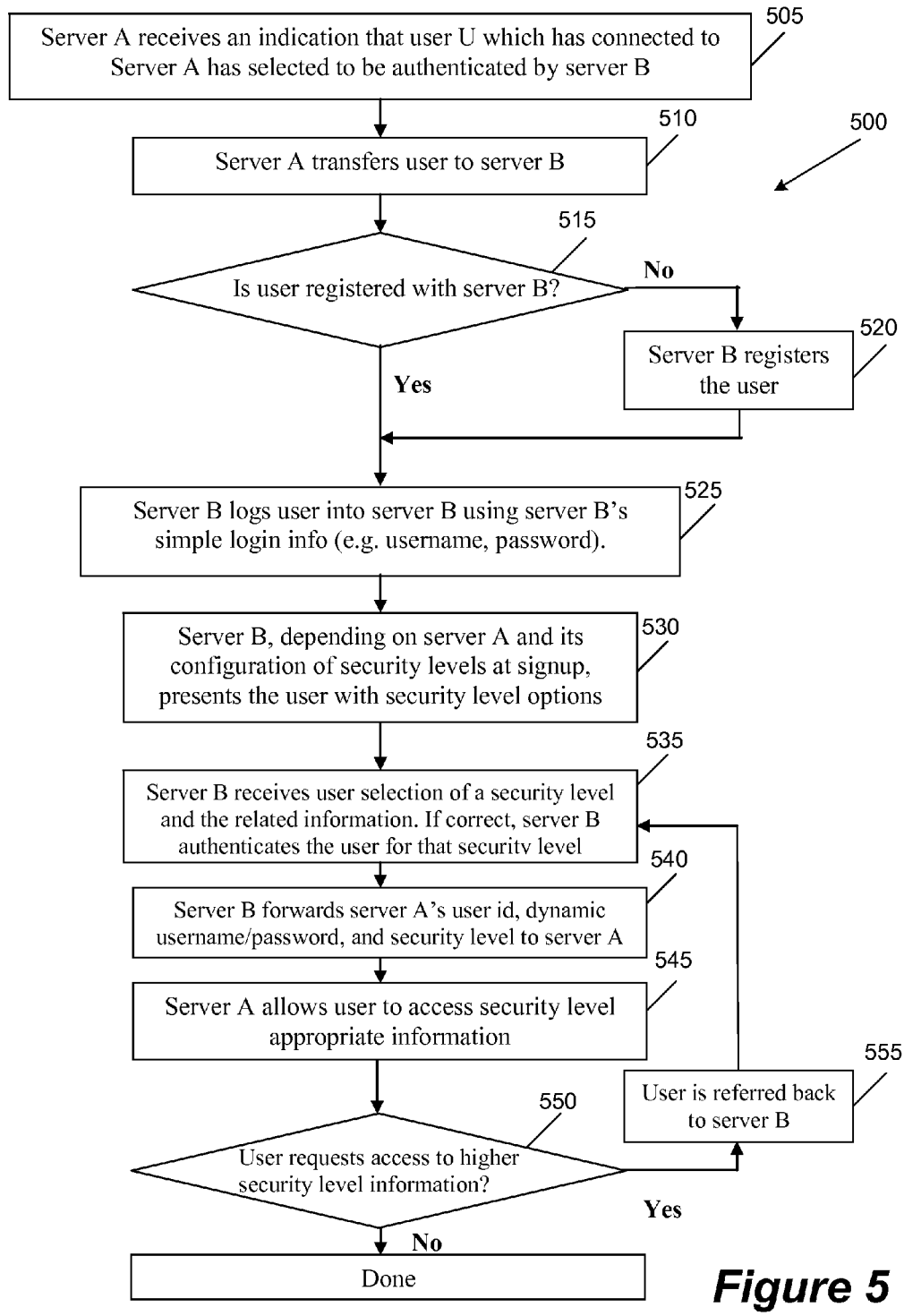
FIG. 5 conceptually illustrates the flow diagram for FIG. 3 in some embodiments of the invention where user goes directly to server A to access information and chooses a link to get authenticated by server B before using server A.

FIG. 5 conceptually illustrates a process 500 and a flow diagram for FIG. 3 in some embodiments of the invention where user U goes directly to server A to access information and chooses a link such as "Secure Sign in Powered by B" to get authenticated by server B before using server A. It is assumed that the user has gone to server A and performed a first time registration, as in FIG. 4. When a user goes to server A to login, server A gives him/her an option to be redirected to server B for improved authentication. For example, server A could be a bank which displays a link "Authentication Powered by B" (e.g., Authentication Powered by Google®") that when clicked takes the user to server B. If the user does not choose the option, server A will do the authentication by conventional methods such as assigning and using its own username/password, security questions, etc. If the user chooses to go to server B then FIG. 5 shows the steps. As shown, server A receives (at 505) an indication that user U which has connected to server A has selected to be authenticated by server B.

Server A redirects (at 510) the user to server B. If the user has not registered before with sever B (as determined at 515) he/she is asked to register with server B first. Server B registers (at 520) the user (if the user don't register, the process ends).

Server B then logs (at 530) the user in to server B using server B's simple login information (e.g. username/password). If the login is incorrect some embodiments give the user other chances to log in before being locked out).

Server B recognizes from the request that the user was forwarded to it by server A since the Server ID is included in the request and can be looked up by server B from the external server database (as described above by reference to FIG. 2). Server B therefore retrieves any information server B needs about server A from this database. Depending on server A and server A's configuration of security levels at signup, server B presents (at 530) the user with security level options (e.g., level 1 no additional information, level 2 secureID, level 3 secureID and location, etc.).

Server B receives (at 535) the user selection of a security level and any additional needed information. If the information is correct, server B authenticates the user for that security level. Server B forwards (at 540) to server A the user's identification for server A (U-A-UID), dynamic username/password, and security level. Server A then allows (at 545) the user to access security level appropriate information. If the user requests (as determined at 550) access for higher security level information, server A refers (at 555) the user to server B to provide additional security information to increase their security and access level before coming back to A for additional security information.

In FIG. 5 server A's authentication role is limited to minimal dynamic username/password checking Server B sends server A the dynamic username/password because server A checks them against the copy in its database. When this dynamic username/password matches, server A enables access for user U. In other words, server A only authorizes access for user U if the supplied dynamic username/password by server B matches its local copy. This is needed so that a fraudulent/fake server cannot pretend to be server B. A fraudulent server does not have access to the dynamically varying username/password. In some embodiments, the user logs in to server B first and from server B selects server A and login to server A through server B. In such a case, server B needs to pass the dynamic username/password to server A. Therefore no other server can claim the identity of server B and try to gain access to server A.

One of ordinary skill in the art will recognize that process 500 shown in FIG. 5 is a conceptual representation of the operations used for registering a user with server A using server B as a bridge server. The specific operations of process 500 may not be performed in the exact order shown and described. Furthermore, the specific operations of process 500 may not be performed in one continuous series of operations and different specific operations may be performed in different embodiments. Also, the process could be implemented using several sub-processes, or as part of a larger macro process. For instance, operations 505, 510, and 545-555 may be performed by server A while operations 515-540 may be performed by server B in some embodiments.

B. User Directly Signing at the Bridge Server

Figure 6:
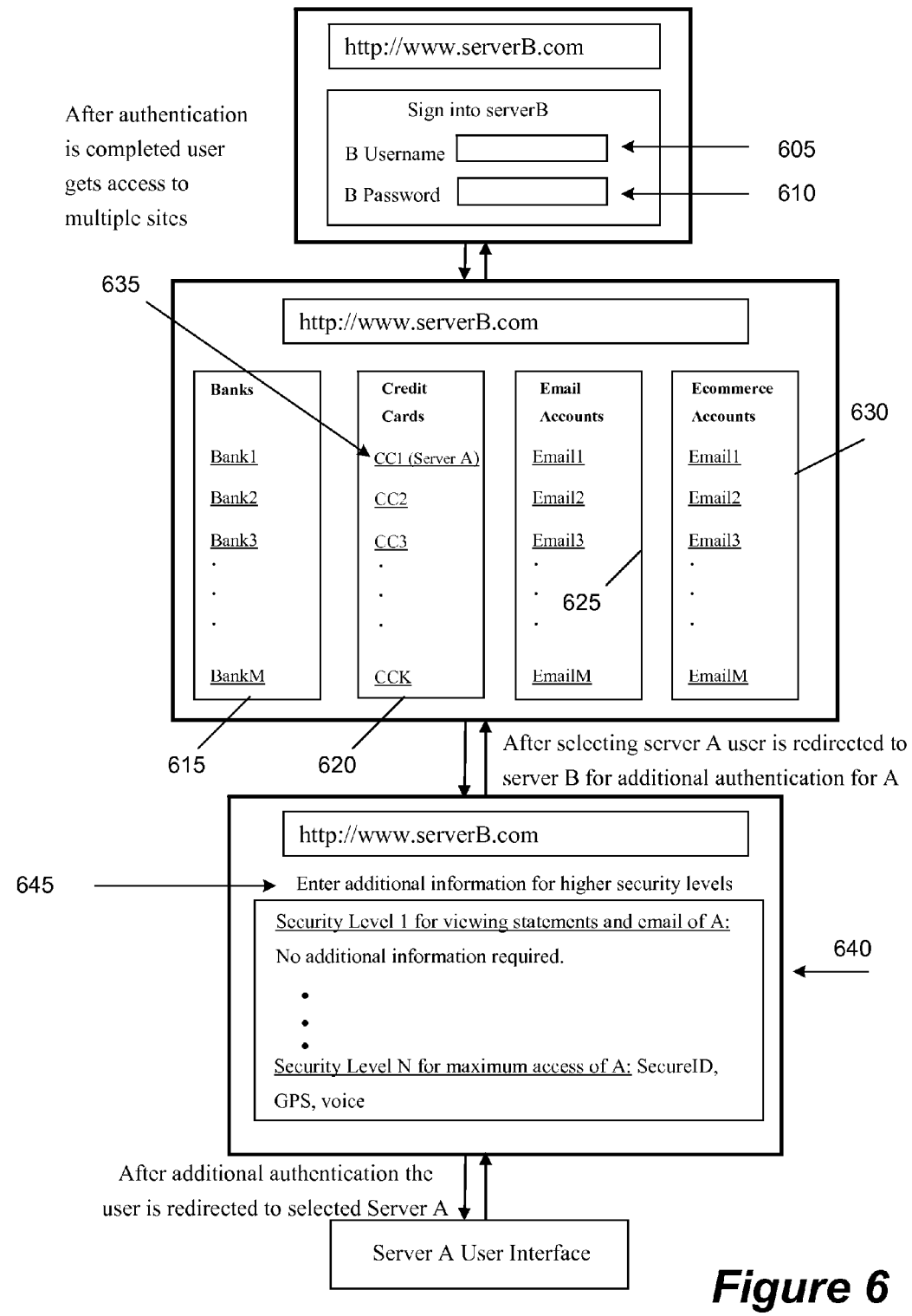
FIG. 6 conceptually illustrates a user interface for a portal site approach in some embodiments of the invention where user goes directly to server B to get authenticated and access his/her accounts on different servers, one of which is server A.
Figure 7:
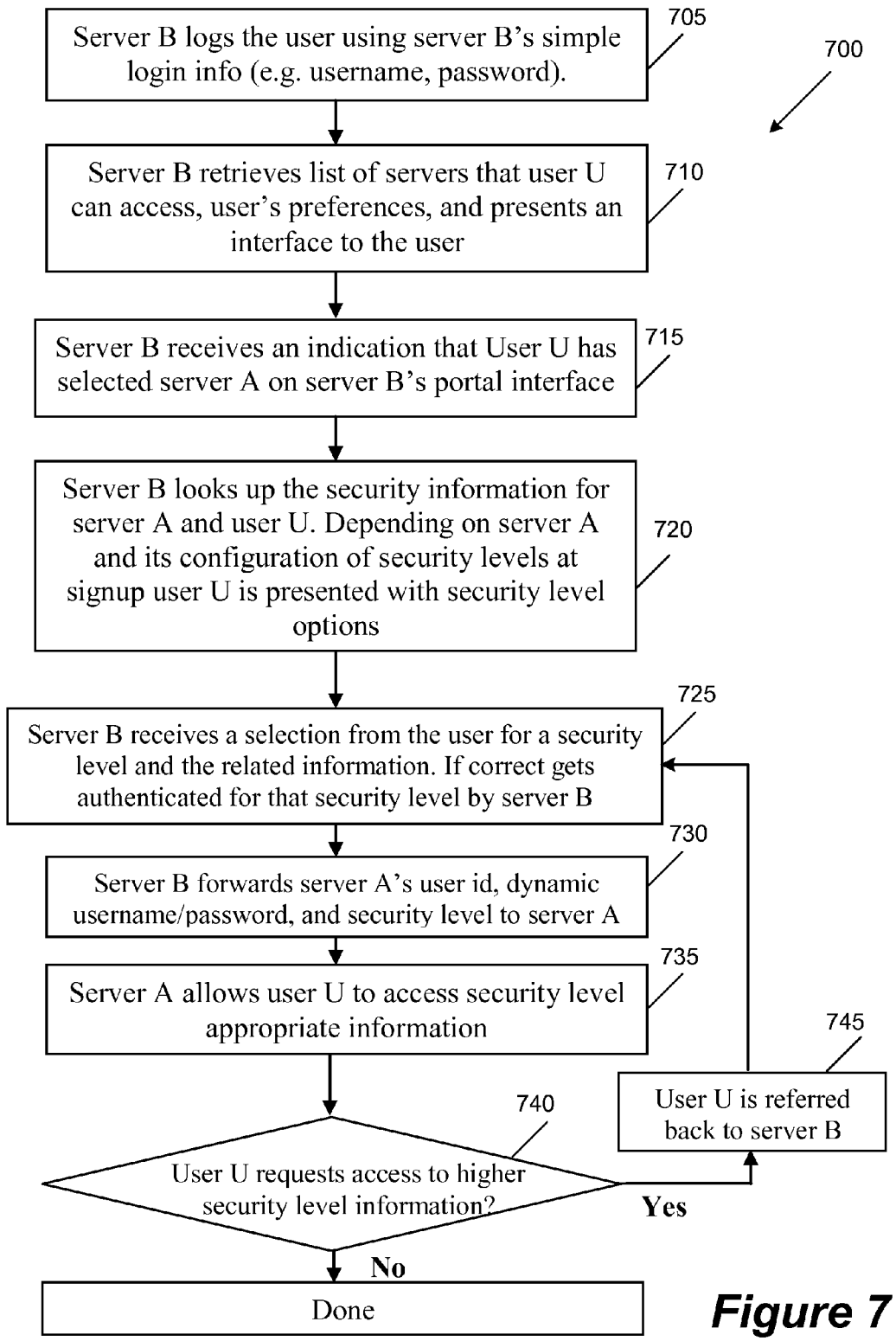
FIG. 7 conceptually illustrates the flow diagram for FIG. 6 in some embodiments of the invention.

FIG. 6 conceptually illustrates a user interface for a portal site approach in some embodiments of the invention where user U goes directly to server B to get authenticated and access his/her accounts on different servers, one of which is server A. FIG. 7 conceptually illustrates a process 700 and a flow diagram for the graphical user interface of FIG. 6 in some embodiments of the invention. These servers, for example, provide access to the user's accounts at different banks 615, credit card companies 620, email companies 625, online ecommerce shopping sites 630, etc.

The process is similar to FIG. 5 where at first server B logs (at 705) the user with the lowest security level of server B, by for example receiving username 605 and password 610. Server B then looks up user U in its database and provides (at 710) user U with a list (615-630) of all the sites/servers that U can access through server B. In this example, the user selects (at 715) server A 635. Then server B looks up (at 720) the security level rules of server A that are stored in one of server B's databases (as described by reference to FIG. 2, above) and provides the user with an interface 640 that asks the user to enter (as shown by 645) additional authentication information for higher security levels in order to access certain information.

Server B then receives (at 725) the user selection for a security level and the additional information, and compares the received information with the stored information on server B. If the information is correct, server B authenticates the user for the selected security level (if incorrect the user is allowed in some embodiments to re-enter a number of times before being locked out). The user is then redirected (at 730) to server A to access (at 735) the appropriate information. If the user wants (as determined at 740) to access additional information that requires a higher security level he/she is redirected back (at 745) to server B to provide additional authentication information before being redirected to server A with a higher security credential.

One of ordinary skill in the art will recognize that process 700 shown in FIG. 7 is a conceptual representation of the operations used for registering a user with server A by first going to server B. The specific operations of process 700 may not be performed in the exact order shown and described. Furthermore, the specific operations of process 700 may not be performed in one continuous series of operations and different specific operations may be performed in different embodiments. Also, the process could be implemented using several sub-processes, or as part of a larger macro process. For instance, operations 705-730 may be performed by server B while operations 735-745 may be performed by server A in some embodiments.

C. Location-Based Authentication

Location-based authentication is a mechanism where online access is authorized only if the user's geographical location is confirmed to be within a pre-determined location or region (e.g. only access bank from work, home, certain cities, zip-codes, streets, countries, etc.). For location-based security to be effective, however, unauthorized users have to be prevented from faking their locations. This section describes the processes and location-based secureID devices for enabling this method of authentication in some embodiments.

Figure 8:
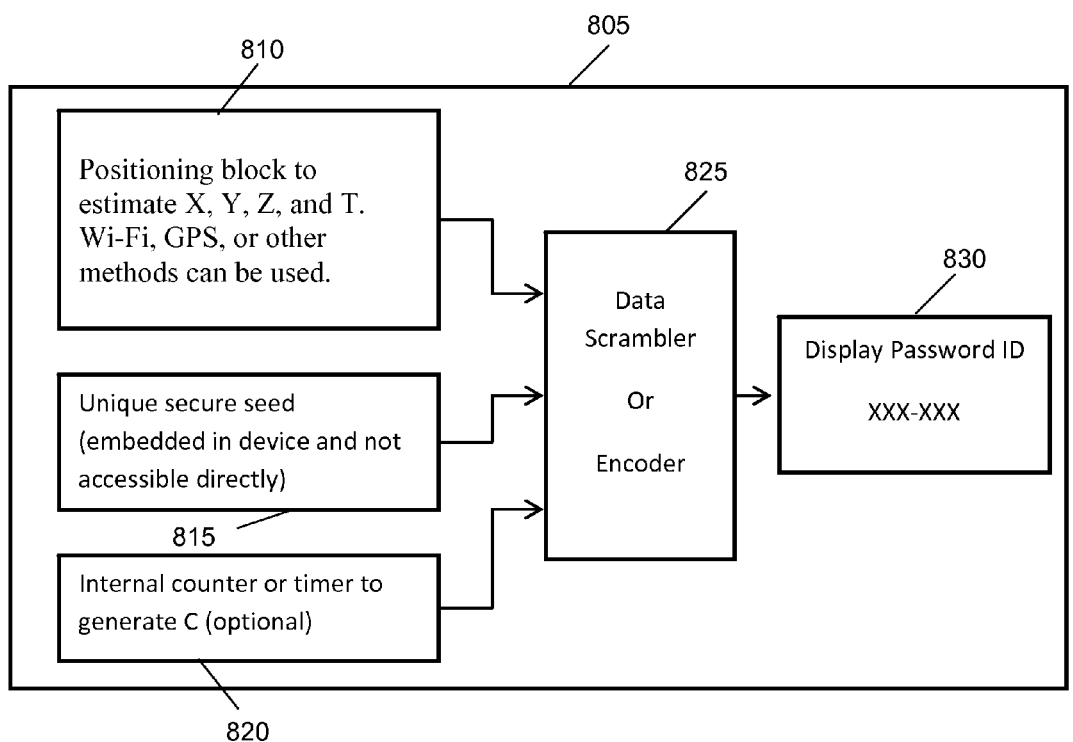
FIG. 8 conceptually illustrates a certified location-based secure ID device in some embodiments of the invention.

FIG. 8 conceptually illustrates a "certified location-based secure ID device" in some embodiments of the invention. In the following it is assumed that user U has signed up with server B and has configured location-based security levels and rules for some of the servers the user wants to access. A conventional secureID tag typically has a seed and a counter.

The device 805 in FIG. 8, however, is a location-enabled secureID tag where a location detection mechanism is added to the tag itself and encoding is used so a hacker cannot fake the location. As shown, the device includes a positioning module 810, a unique secure seed 815, an internal counter/timer 820, a scrambler or encoder 825, and a display 830. These components and modules in different embodiments include hardware, software, or a combination of both.

The positioning module 810 uses different methods to estimate the X, Y, and Z coordinates of the user/device. For instance, Wi-Fi based and GPS based positioning are used in some embodiments. Some embodiments utilize an identification of the access point, e.g., the MacID (or MAC address) of the WiFi access point to find an estimate of location. These embodiments use a database that links the WiFi MAC IDs to location ranges. Additionally, in some embodiments, a time estimate T is also provided by the positioning module 810. In some embodiments, the time estimate is provided by a time estimating module (not shown). The time estimating module in some embodiments is a part of the positioning module 810 while in other embodiments, the time estimating module is a separate module. In embodiments that the positioning module uses GPS, the module resolves time estimate through the signals received from 4 or more GPS satellites. In some embodiments where the positioning module uses WiFi to determine location, the positioning module receives time estimate by using the packets received from the WiFi access point. The values of X, Y, Z, and T are then quantized/digitized and fed to the data scrambler 825. In some embodiments, the latitude and longitude of the device 805 is used instead of or in addition to the X, Y, and Z coordinates.

Unique secure seed 815 is a unique seed assigned exclusively to the device 805. Some embodiments use the seed to encrypt or scramble X/Y/Z/T before displaying it on the device. The seed is a shared secret only between this device and the server B. In some embodiments, the seed is loaded to the device at the time of manufacturing. In some of these embodiments, the device includes a permanent memory (not shown) where the seed is stored. The seed is not directly accessible from outside in some embodiments.

The seed is used to scramble X, Y, Z, and T and to generate a password ID that changes with time and position. The seed that is programmed into the device is shared and synchronized with the seed used by server B when the device is released to user U. Some embodiments provide a serial number that user U provides to server B, from which server B computes the seed. Server B keeps a copy of this seed in server B's database for user U.

Internal counter/timer 820 is a counter used to generate a counter value C. In some embodiments, when the positioning method is not able to estimate parameter T for time, this counter value is used to randomize the generated password ID. In other embodiments, the counter value, C, is used in addition to the estimated parameter, T, to randomize the generated password. Thus, the counter is used to scramble the X, Y, Z, T data and generate a password ID in some embodiments. At the time of the release of the device, this internal counter is synchronized with the counter stored in server B for user U. Some embodiments provide an identification (such as a serial number, an alphanumeric value, or a code) that the user U provides to server B, from which server B computes the internal counter.

Scrambler or encoder 825 is a data scrambler or randomizer, such as a linear shift register and a combination of logic gates. The function of the scrambler or encoder 825 is to generate a password ID as a function of X, Y, Z, T, C, and the secure seed. The functionality of this scrambler is regenerated in server B to match and authenticate the generated password ID for user U. If the scrambler/encoder design is different for each secureID device then the serial number can be used by server B to compute the scrambler/encoder design.

The display 830 is a display screen (e.g., LCD) to demonstrate the generated password ID to user U. The user then enters this password ID when prompted by server B. In other embodiments the password is sent to server B directly without user intervention. Some embodiments establish a link between the secureID device and the user's device or computer. In some embodiments this link is a Bluetooth®, near field communication (NFC), or other short-range wireless links. The password is then directly sent from the secureID device 805 to the user device without the user intervention. Some of these embodiments, therefore, do not include the display 830.

Since server B maintains copies of the seed, counter, and scrambler used in the device released to user U, server B can compute the location of user U from the entered password ID. If the location is within a pre-determined boundary as previously customized by user U, then server B notes that user U has passed the location security level rule. If the user is also authenticated for other required security information (e.g. voice recognition) for a particular server (e.g., server A) then he/she is given access to the particular server.

Figure 9:
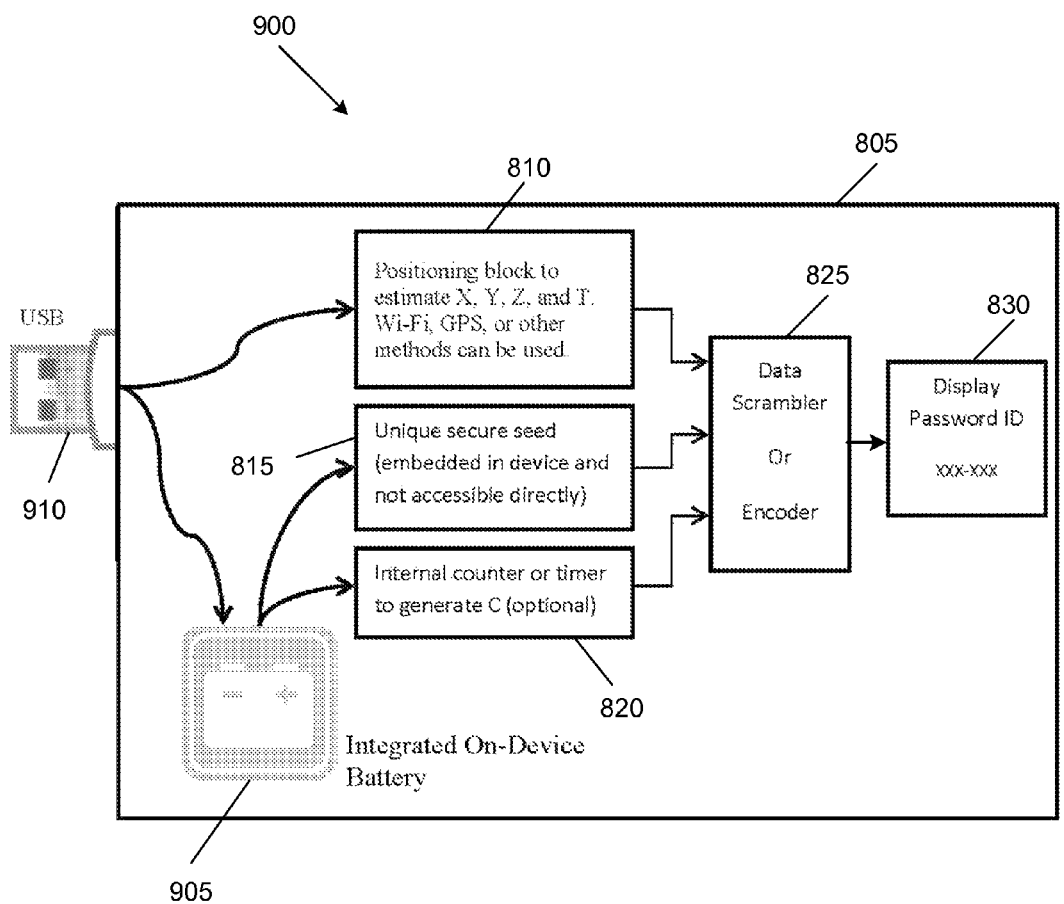
FIG. 9 conceptually illustrates a Universal Serial Bus (USB) dongle or flash drive usage scenario for the location-based password-ID generating device of some embodiments of the invention where a USB interface is used as the power source for the location positioning block.

FIG. 9 conceptually illustrates a Universal Serial Bus (USB) dongle or flash drive usage scenario for the location-based password-ID generating device of some embodiments of the invention, where a USB interface is used as the power supply for the location positioning block. Other embodiments provide other usage scenarios and device's packaging, e.g., with different sources of power supply. For instance the secureID device in some embodiments is integrated into a host mobile device such as a cell phone, laptop, portable music device, etc., where the secureID device power comes from the host device/platform.

The counter block 820 requires very little power for continuous functioning. Therefore, the power source to the counter 820 and seed storage blocks 815 are from an internal integrated battery 905. This battery can last for several years, hence eliminating the need to replace the device or battery. The positioning block 810, however, consumes considerable power and may not be operating continuously from the internal battery. In some embodiments, the positioning block 810 is only switched on when the user is reading the display ID and is turned off at other times in order to conserve power.

FIG. 9 shows the device 900 having a USB connection 910 which is used to supply power to the positioning block 810 in the device 900. One usage scenario is that the user plugs the device 900 into a host USB interface (e.g. a laptop or desktop computer). The device then uses the USB power connection to switch on the positioning block and computes and displays the password ID. This password ID is then used to login to server B. When the USB connector on the device is plugged into a host USB interface, the power line on the USB connection is also used to recharge the internal battery in order to increase its functional lifetime.

III. Electronic System

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 10 conceptually illustrates an electronic system 1000 with which some embodiments of the invention are implemented. The electronic system 1000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1000 includes a bus 1005, processing unit(s) 1010, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 5, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of providing secure access to a first server for a user, the first server providing a plurality of sets of services, each set of services in the plurality of sets of services requiring user authentication at a corresponding security level, the method comprising:
   at a second server different than the first server:
      receiving, from the first server, a list of said plurality of sets of services and the corresponding security levels;
      receiving a request to authenticate the user for accessing the first server;
      providing the list of the plurality of sets of services of the first server to the user;
      receiving a selection of a particular security level to use a corresponding set of services provided by the first server;
      receiving a set of security information to authenticate the user for the selected particular security level;
      validating the received set of security information by the second server; and
      sending a set of credentials from the second server to the first server to authenticate the user on the first server for using the set of services corresponding to the selected particular security level.

2. The method of claim 1, wherein receiving the request to authenticate the user for accessing the first server comprises:
   displaying a list of a set of servers comprising the first server; and
   receiving a selection of the first server as a server to be accessed by the user.

3. The method of claim 1, wherein receiving the selection of the particular security level comprises:
   displaying the plurality of sets of services and the corresponding security levels; and
   receiving the selection of the particular security level based on the displayed sets of services.

4. The method of claim 1 further comprising directing the user to the first server when the received set of security information is validated by the second server.

5. The method of claim 1, wherein sending the set of credentials from the second server to the first server comprises sending a dynamically changing user identification and password corresponding to the user.

6. The method of claim 1 further comprising:
after sending the set of credentials from the second server to the first server, dynamically updating the set of credentials for use in a future authentication of the user by the second server with the first server; and
sending the updated set of credentials from the second server to the first server.

7. The method of claim 1 further comprising:
requesting a server identification from the first server;
receiving the server identification at the second server from the first server; and
authenticating the first server based on the received server identification before sending the set of credentials from the second server to the first server to authenticate the user on the first server.

8. The method of claim 7 further comprising:
dynamically updating the server identification for the first server; and
sending the updated server identification from the second server to the first server for a future authentication of the first server by the second server.

9. The method of claim 1, wherein the particular security level is a first security level, wherein the set of security information is a first set of security information, wherein the set of credentials are a first set of credentials, the method further comprising:
directing the user to the first server after sending the first set of credentials from the second server to the first server;
receiving a request to authenticate the user for accessing a set of services of the first server based on a second security level that is higher than the first security level;
receiving a second set of security information to authenticate the user for the second security level, the second set of security information different than the first set of security information;
validating the second set of security information by the second server; and
sending a second set of credentials from the second server to the first server to authenticate the user on the first server for using the services corresponding to the second security level.

10. The method of claim 1, wherein sending the set of credentials from the second server to the first server comprises:
establishing a secure network among the first server, the second server, and a device used by the user; and
sending the set of credentials from the second server to the first server through the secure network.

11. The method of claim 1, wherein sending the set of credentials from the second server to the first server comprises:
establishing an encrypted communication link between the second server and a device used by the user;
sending the set of credentials from the second server to the device through the established encrypted communication link; and
sending the set of credentials from the device to the first server.

12. The method of claim 1, wherein receiving the request to authenticate the user for accessing the first server comprises:
receiving a request at the first server to authenticate the user; and
redirecting the user from the first server to the second server for authentication of the user by the second server.

13. A non-transitory computer readable medium storing a computer program for authenticating a user, the computer program executable by a processing unit of an authentication server, the computer program comprising sets of instructions for:
displaying a list of a set of servers to the user;
receiving a selection of a particular server from the displayed list of the set of servers;
receiving information for authenticating the user to access the particular server;
validating the information received for authenticating the user;
validating an identity of the particular server using an identification code mutually recognized by the authentication server and the particular server; and
sending, after (i) validating the information received for authenticating the user and (ii) validating the identity of the particular server, a set of credentials to the particular server to enable the user to access the particular server.

14. The non-transitory computer readable medium of claim 13, wherein the computer program further comprises sets of instructions for:
updating, without interaction from the user, the set of credentials for enabling the user to access the particular server each time the user is authenticated by the authentication server; and
sending the updated credentials to the particular server for future authentication of the user on the particular server.

15. The non-transitory computer readable medium of claim 13, wherein the computer program further comprises sets of instructions for:
updating the set of credentials for enabling the user to access the particular server after a pre-determined time has elapsed since a previous update of said credentials; and
sending the updated credentials to the particular server for future authentication of the user on the particular server.

16. The non-transitory computer readable medium of claim 13, wherein the computer program further comprises sets of instructions for:
displaying a plurality of sets of services provided by the particular server, each set of services in the plurality of sets of services associated with a security level in a set of security levels; and
receiving a selection of a particular security level in the set of security levels,
wherein the information for authenticating the user to access the particular server is based on the selected security level, wherein the information for authenticating the user based on the particular security level is different from the information for authenticating the user based on the at least one other security level.

17. The non-transitory computer readable medium of claim 16, wherein the information for authenticating the user based on a selected security level comprises one of a finger print, a result of a retinal scan, a voice signature, a media access control address (MAC address) of a WiFi access point communicatively couple to a device utilized by the user, and a current location of the user.

18. The non-transitory computer readable medium of claim 13, wherein the computer program further comprises sets of instructions for:
requesting a server identification from the particular server;
receiving the server identification from the particular server; and authenticating the particular server based on the received server identification before sending the set of credentials to the particular server to authenticate the user on the particular server.

19. The non-transitory computer readable medium of claim 13, wherein the set of instructions for receiving the information for authenticating the user to access the particular server comprises a set of instructions to receive one of a finger print, a result of a retinal scan, a voice signature, a media access control address (MAC address) of a WiFi access point communicatively couple to a device utilized by the user, and a current location of the user.

20. A non-transitory computer readable medium storing a computer program for providing secure access to a first server for a user by authenticating the user by a second server different than the first server, the first server providing a plurality of sets of services, each set of services in the plurality of sets of services requiring user authentication at a corresponding security level, the computer program executable by a processing unit of the second server, the computer program comprising sets of instructions for:
receiving, from the first server, a list of said plurality of sets of services and the corresponding security levels;
receiving a request to authenticate the user by the second server for accessing the first server;
providing the list of the plurality of sets of services of the first server to the user;
receiving a selection of a particular security level to use a corresponding set of services provided by the first server;
receiving a set of security information to authenticate the user for the selected particular security level;
validating the received set of security information by the second server; and
sending a set of credentials from the second server to the first server to authenticate the user on the first server for using the set of services corresponding to the selected particular security level.

21. The non-transitory computer readable medium of claim 20, wherein the set of instructions for receiving the request to authenticate the user for accessing the first server comprises sets of instructions for:
displaying a list of a set of servers comprising the first server; and
receiving a selection of the first server as a server to be accessed by the user.

22. The non-transitory computer readable medium of claim 20, wherein the set of instructions for receiving the selection of the particular security level comprises sets of instructions for:
displaying a plurality of sets of services and the corresponding security levels; and
receiving the selection of the particular security level based on the displayed sets of services.

23. The non-transitory computer readable medium of claim 20, the computer program further comprising a set of instructions for directing the user to the first server when the received set of security information is validated by the second server.

24. The non-transitory computer readable medium of claim 20, wherein the set of instructions for sending the set of credentials from the second server to the first server comprises a set of instructions for sending a dynamically changing user identification and password corresponding to the user.

25. The non-transitory computer readable medium of claim 20, the computer program further comprising sets of instructions for:
dynamically updating the set of credentials for use in a future authentication of the user by the second server with the first server after sending the set of credentials from the second server to the first server; and
sending the updated set of credentials from the second server to the first server.

26. The non-transitory computer readable medium of claim 20, the computer program further comprising sets of instructions for:
requesting a server identification from the first server;
receiving the server identification at the second server from the first server; and
authenticating the first server based on the received server identification before sending the set of credentials from the second server to the first server to authenticate the user on the first server.

27. The non-transitory computer readable medium of claim 26, the computer program further comprising sets of instructions for:
dynamically updating the server identification for the first server; and
sending the updated server identification from the second server to the first server for a future authentication of the first server by the second server.

28. The non-transitory computer readable medium of claim 20, wherein the particular security level is a first security level, wherein the set of security information is a first set of security information, wherein the set of credentials are a first set of credentials, the computer program further comprising sets of instructions for:
directing the user to the first server after sending the first set of credentials from the second server to the first server;
receiving a request to authenticate the user for accessing a set of services of the first server based on a second security level that is higher than the first security level;
receiving a second set of security information to authenticate the user for the second security level, the second set of security information different than the first set of security information;
validating the second set of security information by the second server; and
sending a second set of credentials from the second server to the first server to authenticate the user on the first server for using the services corresponding to the second security level.

29. The non-transitory computer readable medium of claim 20, wherein the set of instructions for sending the set of credentials from the second server to the first server comprises sets of instructions for:
establishing a secure network among the first server, the second server, and a device used by the user; and
sending the set of credentials from the second server to the first server through the secure network.

30. The non-transitory computer readable medium of claim 20, wherein the set of instructions for sending the set of credentials from the second server to the first server comprises sets of instructions for:
establishing an encrypted communication link between the second server and a device used by the user;
sending the set of credentials from the second server to the device through the established encrypted communication link; and
sending the set of credentials from the device to the first server.

31. The non-transitory computer readable medium of claim 20, wherein the set of instructions for receiving the request to authenticate the user for accessing the first server comprises sets of instructions for:
   receiving a request at the first server to authenticate the user; and
   redirecting the user from the first server to the second server for authentication of the user by the second server.

* * * * *